(12) United States Patent
Harper (10) Patent No.: US 10,444,054 B2
(45) Date of Patent: Oct. 15, 2019

(54) CAPACITANCE-TYPE SENSOR PROBE

(71) Applicant: WESTPORT POWER INC., Vancouver (CA)

(72) Inventor: Gregory C. Harper, Delta (CA)

(73) Assignee: WESTPORT POWER INC., Vancouver (CA)

( * ) Notice: Subject to any disclaimer, the term of this patent is extended or adjusted under 35 U.S.C. 154(b) by 178 days.

(21) Appl. No.: 15/038,807

(22) PCT Filed: Nov. 14, 2014

(86) PCT No.: PCT/CA2014/051092
§ 371 (c)(1),
(2) Date: May 24, 2016

(87) PCT Pub. No.: WO2015/077874
PCT Pub. Date: Jun. 4, 2015

(65) Prior Publication Data
US 2017/0030760 A1    Feb. 2, 2017

(30) Foreign Application Priority Data

Nov. 28, 2013  (CA) .................................. 2835473

(51) Int. Cl.
*G01F 23/26*    (2006.01)
(52) U.S. Cl.
CPC .......... *G01F 23/268* (2013.01); *G01F 23/263* (2013.01)
(58) Field of Classification Search
CPC ....... G01F 23/26; G01F 23/263; G01F 23/268
See application file for complete search history.

(56) References Cited

U.S. PATENT DOCUMENTS

| | | | |
|---|---|---|---|
| 4,417,473 A | | 11/1983 | Tward et al. |
| 4,512,067 A | * | 4/1985 | Kobayashi ............ G01F 23/263 29/25.41 |

(Continued)

FOREIGN PATENT DOCUMENTS

| | | |
|---|---|---|
| CA | 2 629 960 C | 12/2009 |
| EP | 2 088 405 A2 | 8/2009 |

(Continued)

OTHER PUBLICATIONS

Extended European Search Report, dated Jun. 14, 2017, for European Application No. 14865290.2-1553 / 3074732, 10 pages.

(Continued)

*Primary Examiner* — Justin N Olamit
(74) *Attorney, Agent, or Firm* — Seed Intellectual Property Law Group LLP (57) ABSTRACT

Sensor probes for capacitance-type liquid level sensors do not comprise an acceptable balance between cost, performance and durability for mobile applications. An improved sensor probe is provided. A first electrode comprises two or more first plate sections arranged in angular relationship with respect to each other. A second electrode comprises two or more second plate sections arranged in angular relationship with respect to each other. Spacers are located between the first and second electrodes such that each first plate section is spaced apart in parallel and substantially overlapping relationship with respective second plate sections. Fasteners securely fix the first and second electrodes in position.

11 Claims, 5 Drawing Sheets

(56) References Cited

U.S. PATENT DOCUMENTS 4,982,606 A * 1/1991 Adamski ............... D06F 39/087
                                                     137/387
2011/0162448 A1    7/2011  McGaughey et al.

FOREIGN PATENT DOCUMENTS

| GB | 2 089 516 A | 6/1982 |
|----|-------------|--------|
| JP | 59-114416 A | 7/1984 |

OTHER PUBLICATIONS

International Search Report and Written Opinion, dated Jan. 22, 2015, for PCT/CA2014/051092, 7 pages.

* cited by examiner

CAPACITANCE-TYPE SENSOR PROBE

FIELD OF THE INVENTION

The present application relates to a sensor probe for a capacitance-type liquid level sensor.

BACKGROUND OF THE INVENTION

Capacitance-type liquid level sensors measure the level of a liquid in a container and comprise a sensor probe submerged in a liquid medium. The sensor probe comprises a pair of electrodes that form a capacitor having the liquid and/or air between them acting as a dielectric. As the level of the liquid in the container varies the effective dielectric constant between the electrodes changes, which changes the capacitance of the sensor probe. The liquid level can be determined by detecting and measuring the change in capacitance.

It is known to use concentric, electrically conductive tubes as electrodes for sensor probes. This arrangement provides a relatively large surface area between the electrodes compared to the volume they occupy, allowing a relatively large capacitance to be formed. The larger the capacitance per unit height of the sensor probe the greater the change in capacitance per unit change in liquid level, allowing a greater sensitivity in level measurements. For concentric tube sensor probes, it is difficult to reduce the tolerance of the inner diameter of an outer tube and the outer diameter of an inner tube in a low cost liquid level sensor. Part to part variation in these dimensions leads to errors in level measurements. Custom spacers need to be developed that arrange the inner tube within the outer tube, leading to further increases in cost. For these and other reasons parallel plate-type sensor probes have been developed.

Parallel plate-type sensor probes comprise two flat plate electrodes that are spaced apart from each other. In mobile applications where the liquid level sensor is measuring the level of a fuel in a tank elongated probes can be susceptible to bending, sloshing of the fuel can cause deformation in the flat plate electrodes. Strength properties required to resist bending and deformation limit how much the thickness can be reduced and correlates directly to the cost of the sensor probe.

U.S. Pat. No. 4,512,067, issued Apr. 23, 1985 to Nissan Motor Company, Limited, the '067 patent, discloses a liquid container having electrode plates to detect liquid level by measuring capacitance. A sensor probe is formed by baffle plates 20A and 20B and electrode plates 30A, 30B and 30C. More specifically, a capacitor is formed between baffle plate 20A and electrode plate 30A, another capacitor is formed between baffle plate 20B and electrode plate 30B, and a third capacitor is formed between baffle plate 20B and 30C. The baffle plates serve dual functions, namely (1) suppressing a rapid and violent movement and/or heavy undulation of liquid fuel contained in a tank during operation of a vehicle, and (2) serving as electrodes for three capacitors. Although the thickness of baffle plates 20A and 20B is made smaller than the wall thickness of the upper and lower shells 12 and 14 of tank 10, there is a limit to how thin the baffle plates can be since they serve to suppress the rapid and violent movement and/or the heavy undulation of liquid fuel. Furthermore, the arrangement of the electrodes that make up the sensor probe capacitor is complex and costly and reduces the accuracy of liquid level measurements. In the event of sloshing, the oversized baffle plate electrodes redirect the flow of sloshing fuel in between the capacitor electrodes effectively changing the dielectric constant leading to level measurement errors.

The state of the art is lacking in sensor probes that provide accurate and repeatable capacitance measurements, occupy a relatively small volume, and are economical to manufacture. There is a need for an improved capacitance-type sensor probe with these characteristics.

SUMMARY OF THE INVENTION

An improved sensor probe is provided. A first electrode comprises two or more first plate sections arranged in angular relationship with respect to each other. A second electrode comprises two or more second plate sections arranged in angular relationship with respect to each other. Spacers are located between the first and second electrodes such that each first plate section is spaced apart in parallel and substantially overlapping relationship with respective second plate sections. Fasteners securely fix the first and second electrodes in position.

Electric field lines emanating from a first end of the two or more first plate sections terminate at a respective second end of the two or more second plate sections within a predetermined range of tolerance. The thickness of each first and second plate section is less than 10 millimeters, and preferably less than 5 millimeters, and more preferably within a range of 0.5 millimeters to 4 millimeters. The sensor probe can be securely positioned within a container for holding a liquid such that the sensor probe is electrically isolated from said container.

In a preferred embodiment, the spacers are washers and the fasteners comprise bolts and nuts. The first and second electrodes comprise bores that are aligned with the washers such that the bolts extend from one side of the first electrode to be fastened at an opposite side of the second electrode by the nuts thereby securing the first and second electrodes in position. The first electrode can comprise recessed grooves around respective bores and the washers comprise shoulders that are mutually engageable with the grooves.

In another preferred embodiment, the spacers comprise first and second strips. The first strip is positioned near one end of said first and second electrodes and said second strip is positioned near an opposite end, such that the first and second strips extend from an upper end to a lower end of said first and second electrodes. Fasteners, such as bolts or rivets, can extend through aligned boards in the first and second electrodes and the first and second strips to secure the first and second electrodes in position.

In yet another preferred embodiment, the first electrode comprises first, second and third plate sections and said second electrode comprises fourth, fifth and sixth plate sections. The first, second and third plate sections are spaced apart from said fourth, fifth and sixth plate sections respectively, and the first, second and third plate sections are substantially equal in length in a lateral direction to said sixth, fifth and fourth plate sections respectively.

DETAILED DESCRIPTION OF PREFERRED EMBODIMENT(S)

Figure 1:
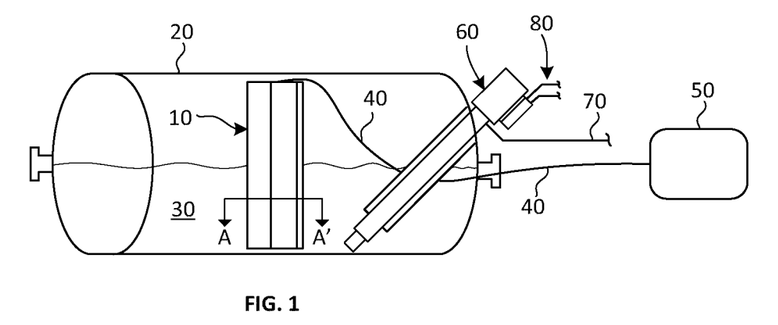
FIG. 1 is a schematic view of a sensor probe (not to scale) in a cryogenic vessel connected with a measurement circuit according to a first embodiment.
Figure 2:
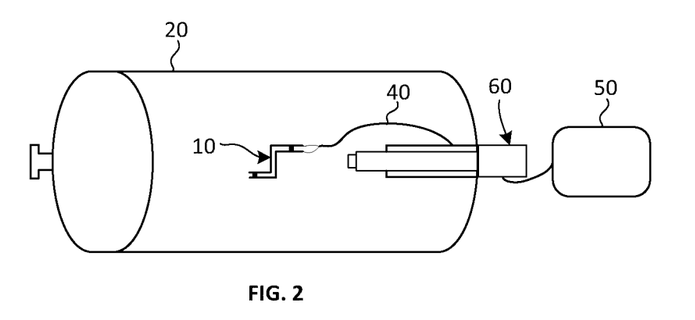
FIG. 2 is a plan view of the sensor probe of FIG. 1.

Referring to FIGS. 1 and 2, there is shown sensor probe 10 according to a first embodiment positioned and secured in container 20. Sensor probe 10 is part of a capacitance-type level sensor for measuring the level of liquid 30 in container 20. In some applications container 20 is a cryogenic vessel for storing a cryogenic liquid such as liquefied natural gas (LNG), liquid methane or liquefied propane gas (LPG). In other embodiments container 10 can be any type of container that holds a liquid whose level within the container needs to be measured. Line 40 electrically connects sensor probe 10 with controller 50, also known as a measurement circuit, which operates to send an electrical signal to the sensor probe and to measure a resulting voltage or current signal (a capacitance measurement signal) such that the capacitance of the sensor probe can be determined. The Applicant's co-owned Canadian Patent No. 2,629,960 discloses an example of such a controller 50. In a preferred embodiment sensor probe 10 is electrically isolated from container 20, which is advantageous to reduce electrical noise that can be conducted from the container to controller 50. In this disclosure, electrical noise is an unwanted electrical signal that is superimposed on the capacitance measurement signal of sensor probe 10. For example, when container 20 is a fuel tank in an automotive application it is possible that engine electrical noise can be conducted through the container to controller 50 if sensor probe 10 is not electrically isolated from the container. Noise reduces the accuracy of the measurement of the capacitance of sensor probe 10 and consequently the determination of the level of the liquid. Line 40 comprises a first electrical wire connected to first electrode 100 and a second electrical wire connected to second electrode 110 when sensor probe 10 is isolated from container 20. When sensor probe 10 is not electrically isolated from container 20 then line 40 can comprise only the first electrical wire that is connected to first electrode 100, and second electrode 110 can be connected to container 20, which is grounded, although this is not a requirement and the second electrical wire can still be employed. Also shown in FIGS. 1 and 2 is pump 60 for pumping liquid 30 to a downstream consumer (such as an internal combustion engine) through conduit 70. Hydraulic lines 80 supply hydraulic fluid to actuate pump 60.

Figure 3:
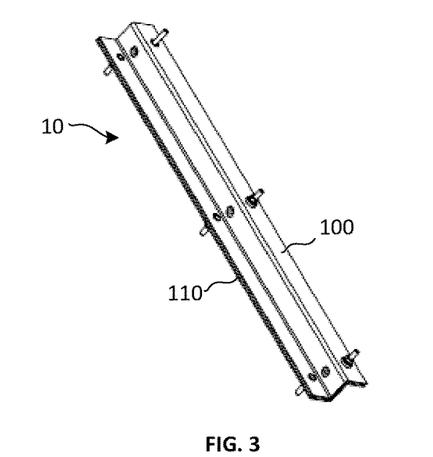
FIG. 3 is a perspective view the sensor probe of FIG. 1.
Figure 4:
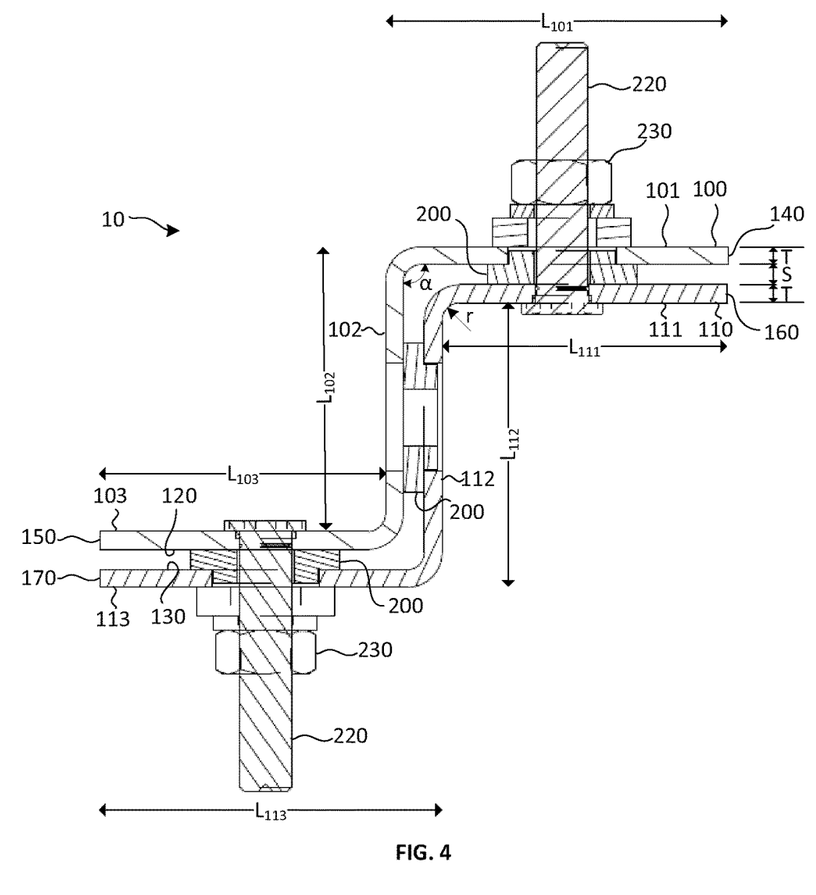
FIG. 4 is a cross-sectional view taken along line A-A' of the sensor probe of FIG. 1.
Figure 5:
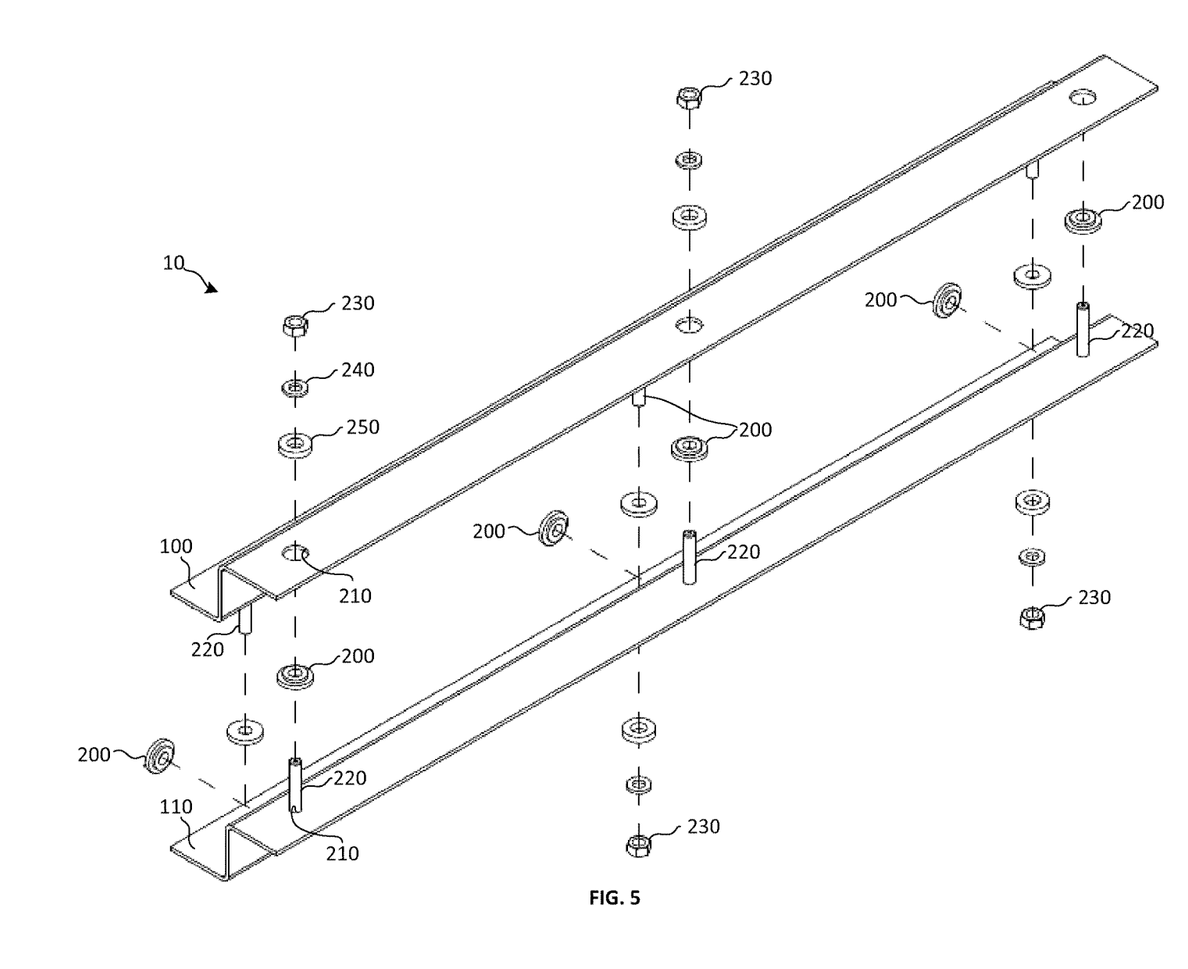
FIG. 5 is an exploded view of the sensor probe of FIG. 1.

With reference to FIGS. 3, 4 and 5 sensor probe 10 is now described in more detail. Sensor probe 10 comprises first electrode 100 and second electrode 110. In a preferred embodiment first electrode 100 is a unitary plate formed into first plate sections 101, 102 and 103 (collectively, the "first plate sections") and second electrode 110 is also a unitary plate formed into second plate sections 111, 112 and 113 (collectively, the "second plate sections"). In other embodiments the electrodes can each comprise two or more plate sections with the same number of plate sections for each electrode and with each electrode having substantially the same shape. In another preferred embodiment, length $L_{101}$ of first plate section 101 is substantially equal to length $L_{113}$ of second plate section 113, length $L_{103}$ of first plate section 103 is substantially equal to length $L_{111}$ of second plate section 111, and length $L_{102}$ of first plate section 102 is substantially equal to length $L_{112}$ of second plate section 112. Lengths $L_{101}$, $L_{102}$, $L_{103}$, $L_{111}$, $L_{112}$, and $L_{113}$ represent lengths in a lateral direction of sensor probe 10. First plate sections 101 and 102 are angularly arranged with respect to each other as represented by angle $\alpha$, which is approximately 90 degrees in the illustrated embodiment, although this is not a requirement. Similarly, first plate sections 102 and 103 are angularly arranged with respect to each other, second plate sections 111 and 112 are angularly arranged with respect to each other and second plate sections 112 and 113 are angularly arranged with respect to each other. First plate sections 101, 102 and 103 are spaced apart from second plate sections 111, 112 and 113 respectively such that first electrode 100 is separated from second electrode 110 by spacing S. It is preferred to have uniform spacing between first and second electrodes 100 and 110, although it is not a requirement.

Figure 6:
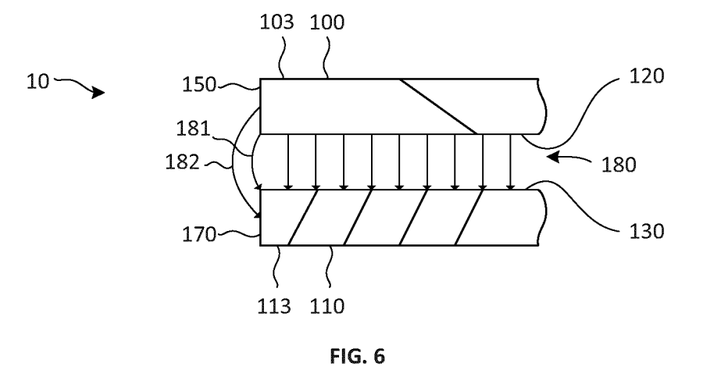
FIG. 6 is a detail view near end portions of the sensor probe of FIG. 1.
Figure 7:
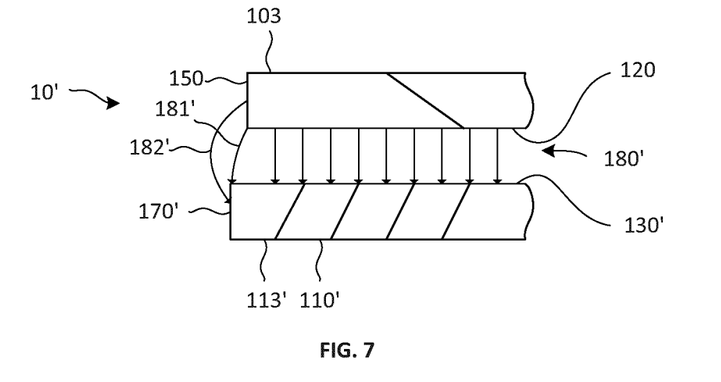
FIG. 7 is a detail view near end portions of a sensor probe similar the sensor probe of FIG. 1 where a second end of a second electrode extends beyond a first end of a first electrode within a predetermined range of tolerance.
Figure 8:
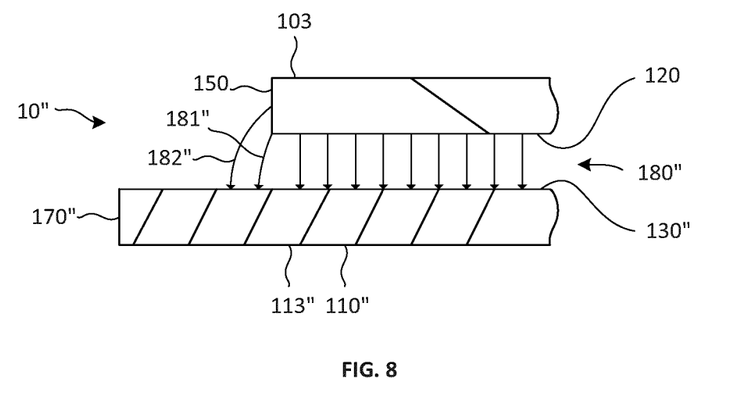
FIG. 8 is a detail view near end portions of a sensor probe similar the sensor probe of FIG. 1 where a second end of a second electrode extends beyond a first end of a first electrode outside a predetermined range of tolerance.

First plate sections 101, 102 and 103 substantially overlap second plate sections 111, 112 and 113 respectively. In this disclosure overlap is defined as "to have parts that are substantially the same as parts of something else". The first and second plate sections overlap such that electric field lines created between first and second electrodes 100 and 110 when an electrical potential exists therebetween extend generally at right angles to surfaces 120 and 130 of these electrodes and electric field lines emanating near lateral ends 140 and 150 terminate near corresponding lateral ends 160 and 170 respectively within a predetermined range of tolerance. This is illustrated in FIG. 6 that shows a detail view of first and second plate sections 103 and 113 near lateral ends 150 and 170 respectively. Electric field lines 180 extend between electrodes 100 and 110. Electric field lines 181 and 182 emanating at lateral end 150 extend toward and terminate at lateral end 170. FIG. 7 illustrates a modified example where lateral end 170' of second plate section 113' extends beyond lateral end 150 of first plate section 103. However, electrodes 103 and 113' substantially overlap such that electric field lines 181' and 182' emanating from lateral end 150 terminate at or sufficiently near lateral end 170'. In the illustration of FIG. 8, lateral end 170" of second plate section 113" extends beyond lateral end 150 outside the predetermined range of tolerance such that electric field lines 181" and 182" emanating from lateral end 150 do not terminate at or near lateral end 170". In the embodiment of FIG. 8, test results have shown that sensor probe 10" is more sensitive to sloshing than sensor probes 10 and 10' illustrated in FIGS. 6 and 7 respectively. For example, when the direction of sloshing is substantially at right angles to surfaces 120, 130, 130' and 130", the effective dielectric constant varies to a greater degree as the liquid sloshes for sensor probe 10" of FIG. 8 compared to sensor probes 10 and 10' of FIGS. 6 and 7 because the extension of plate 113" further beyond lateral end 150 affects fluid flow around and between plates 103 and 113". This can lead to a greater variation in measured capacitance and consequently the level reading from sensor probe 10" as the liquid sloshes without the quantity of liquid in the container changing. An explanation for this phenomenon is related to how electric field lines 182, 182' and 182" terminate on electrodes 110, 110' and 110". In FIG. 8, electric field line 182" terminates on surface 130", whereas electric field lines 182 and 182' terminate on surfaces of lateral ends 170 and 170'. When sloshing occurs, the effective dielectric constant in the vicinity of electric field line 182" can change to a greater degree compared to in the vicinity of electric field lines 182 and 182'. The probes 10 and 10' when sloshing occurs since the ability of sensor probe 10" to support an electric field density changes to a greater degree.

Returning to FIGS. 3, 4 and 5, spacers 200 operate to separate first and second electrodes 100 and 110 by spacing S. In a preferred embodiment spacers 200 are shoulder washers that insert into bores 210 in first electrode 100. Fasteners comprising bolts 220 and nuts 230 secure first and second electrodes 100 and 110 together. Bolts 220 extend through respective bores 210 in first and second electrodes 100 and 110 and spacers 200 and are secured in position by respective nuts 230. Additional hardware such as washers 240 and 250 can be employed and are preferred as would be known to those skilled in the technology of fastening, but are not required. Other techniques of fastening can be employed, such as rivets, in place of bolts and nuts.

Electrodes 100 and 110 can be formed by bending flat plates. Corresponding bends in electrodes 100 and 110 have mutually congruent bend radii, illustrated in FIG. 4 as radius r for one pair of corresponding bends. Electrodes 100 and 110 can also be extruded in which case radius r can be made smaller such that radius r can be infinitesimally small or in an ideal case the angles between opposite plates maintain a constant gap distance S. First plate sections 101, 102 and 103 and second plate sections 111, 112 and 113 can also be separate plates that are connected together, such as by welding or fastening, to form electrodes 100 and 110 respectively. In a preferred embodiment first and second electrodes 100 and 110 have the same thickness T, however this is not a requirement. In preferred embodiments thickness T is less than 10 millimeters (mm), and more preferably less than 5 mm. In more preferred embodiments thickness T is within a range of 0.5 mm to 4 mm.

Figure 9:
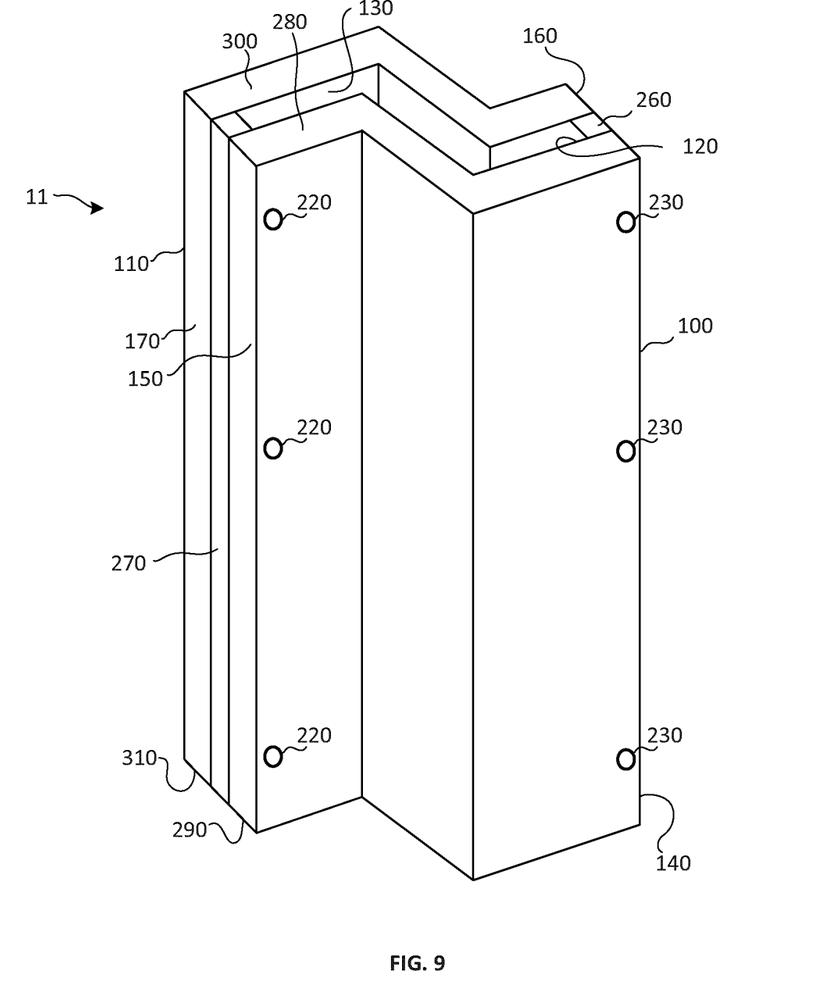
FIG. 9 is a perspective view of a sensor probe comprising elongate strips for spacers according to a second embodiment.

Referring to FIG. 9 sensor probe 11 is shown according to another embodiment that is similar to the previous embodiment where like parts have like reference numerals that may not be described in detail, if at all. First and second spacers 260 and 270 are elongate strips that extend in one direction between upper ends 280 and 300 to lower ends 290 and 310, and in another direction between surfaces 120 and 130. First and second spacers 260 and 270 operate to retain liquid that is between first and second electrodes 100 and 110 in the event of sloshing such that the amount of liquid between the first and second electrodes remains substantially unchanged, and therefore the effective dielectric constant and capacitance of sensor probe 11 remain substantially unchanged. The liquid can enter and leave the space between first and second electrodes 100 and 110 below lower ends 290 and 310, and above upper ends 280 and 300. This is advantageous in those applications where the liquid whose level is being measured sloshes due to movement of the container in which it's held. In a preferred embodiment the outward facing surface of first spacer 260 is positioned near or co-planar with outward facing surfaces at lateral ends 140 and 160, and the outward facing surface of second spacer 270 is positioned near or co-planar with outward facing surfaces at lateral ends 150 and 170 of first and second electrodes 100 and 110 respectively, such that the area defined by the plates between the spacers is enlarged and the capacitance between the first and second spacers is increased compared to when the first spacer is positioned inwards from the surfaces at lateral ends 140 and 160 and/or the second spacer is positioned inwards from the surfaces at lateral ends 150 and 170.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. An apparatus, comprising:
a sensor probe for a capacitance-type liquid level sensor comprising:
a first electrode comprising two or more first plate sections, each first plate section having an interior plate surface in a plane, adjacent ones of the first plate sections arranged in angular relationship with respect to each other such that the planes of the interior plate surfaces of adjacent ones of the first plate sections intersect;
a second electrode comprising two or more second plate sections, each second plate section having an interior plate surface in a plane, adjacent ones of the second plate sections arranged in angular relationship with respect to each other such that the planes of the interior plate surfaces of adjacent ones of the second plate sections intersect;
spacers located between said first and second electrodes such that each first plate section is spaced apart in parallel and substantially opposing relationship with respective second plate sections, and the interior plate surface of each first plate section is substantially overlapping with, and facing, the interior plate surface of the respective second plate section and extending in a same direction as the interior plate surface of the respective second plate section; and
fasteners for securely fixing said first and second electrodes in position; and
a container for a liquid, wherein said sensor probe is secured with respect to said container and electrically isolated from said container.

2. The sensor probe of claim 1, wherein electric field lines emanating from a first end of said two or more first plate sections terminate at a second end of said two or more second plate sections.

3. The sensor probe of claim 1, wherein a thickness of each first and second plate section is less than 10 millimeters.

4. The sensor probe of claim 1, wherein a thickness of each first and second plate section is less than 5 millimeters.

5. The sensor probe of claim 1, wherein a thickness of each first and second plate section is within a range of 0.5 millimeters to 4 millimeters.

6. The sensor probe of claim 1, wherein said spacers comprise washers.

7. The sensor probe of claim 6, wherein said first and second electrodes comprise bores and said washers comprise shoulders that are mutually engageable with said bores in said first electrode, said fasteners comprising bolts and nuts wherein respective bolts extend through respective bores and washers and engage respective nuts to secure said first and second electrodes in relative position.

8. The sensor probe of claim 1, wherein said spacers comprise first and second strips, said first strip positioned near corresponding lateral ends of said first and second electrodes and said second strip positioned near opposite corresponding lateral ends, said first and second strips extending from an upper end to a lower end of said first and second electrodes.

9. The sensor probe of claim 8, wherein said first and second electrodes comprise bores with said first and second strips, said fasteners comprising bolts and nuts wherein respective bolts extend through respective concentric bores and engage respective nuts to secure said first and second electrodes in relative position.

10. An apparatus for providing a variable capacitor comprising:
   a sensor probe for a capacitance-type liquid level sensor comprising:
      a first electrode comprising two or more first plate sections, each first plate section having an interior plate surface in a plane, adjacent ones of the first plate sections arranged in angular relationship with respect to each other such that the planes of the interior plate surfaces of adjacent ones of the first plate sections intersect;
      a second electrode comprising two or more second plate sections, each second plate section having an interior plate surface in a plane, adjacent ones of the second plate sections arranged in angular relationship with respect to each other such that the planes of the interior plate surfaces of adjacent ones of the second plate sections intersect;
      spacers located between said first and second electrodes such that each first plate section is spaced apart in parallel and substantially opposing relationship with respective second plate sections, and the interior plate surface of each first plate section is substantially overlapping with, and facing, the interior plate surface of the respective second plate section and extending in a same direction as the interior plate surface of the respective second plate section; and
      fasteners for securely fixing said first and second electrodes in position;
   a container for holding a variable amount of a liquid; and
   first and second electrical wires connected to said first and second electrodes respectively; wherein said first and second electrodes are secured with respect to said container and electrically isolated from said container.

11. A sensor probe for a capacitance-type liquid level sensor comprising:
   a first electrode comprising first, second and third plate sections, the first, second, and third plate sections each having an interior plate surface in a plane, the first and second plate sections arranged in angular relationship with respect to each other such that the plane of the interior plate surface of the first plate section intersects with the plane of the interior plate surface of the second plate section, and the second and third plate sections arranged in angular relationship with respect to each other, such that the plane of the interior plate surface of the second plate section intersects with the plane of the interior plate surface of the third plate section;
   a second electrode comprising fourth, fifth and sixth plate sections, the fourth, fifth, and sixth plate sections each having an interior plate surface in a plane, the fourth and fifth plate sections arranged in angular relationship with respect to each other such that the plane of the interior plate surface of the fourth plate section intersects with the plane of the interior plate surface of the fifth plate section, and the fifth and sixth plate sections arranged in angular relationship with respect to each other such that the plane of the interior plate surface of the fifth plate section intersects with the plane of the interior plate surface of the sixth plate section;
   spacers located between said first and second electrodes such that said first, second and third plate sections are spaced apart in parallel and substantially opposing relationship from said fourth, fifth and sixth plate sections respectively, at least the interior plate surfaces of the first plate section and the fourth plate section extending in a same direction and facing each other, the interior plate surfaces of the second plate section and the fifth plate section extending in a same direction and facing each other, and the interior plate surfaces of the third plate section and the sixth plate section extending in a same direction and facing each other; and
   fasteners for securely fixing said first and second electrodes in position, wherein said first, second and third plate sections are substantially equal in length in a lateral direction to said sixth, fifth and fourth plate sections respectively.

* * * * *